United States Patent
Yoda (10) Patent No.: US 7,997,966 B2
(45) Date of Patent: Aug. 16, 2011

(54) COOLING STRUCTURE FOR ELECTRICITY STORAGE DEVICE

(75) Inventor: Takehito Yoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 612 days.

(21) Appl. No.: 12/083,337

(22) PCT Filed: Oct. 11, 2006

(86) PCT No.: PCT/JP2006/320692
§ 371 (c)(1),
(2), (4) Date: Apr. 10, 2008

(87) PCT Pub. No.: WO2007/043691
PCT Pub. Date: Apr. 19, 2007

(65) Prior Publication Data
US 2009/0257190 A1    Oct. 15, 2009

(30) Foreign Application Priority Data
Oct. 14, 2005 (JP) ................ 2005-300658

(51) Int. Cl.
*F24F 7/007* (2006.01)
*B60H 1/22* (2006.01)

(52) U.S. Cl. .......... 454/339; 454/141; 454/69; 454/162; 454/165; 62/259.2; 361/695

(58) Field of Classification Search ............... 454/141, 454/69, 162, 165, 339; 62/178, 186, 259.2; 361/695; 180/68.1; 137/339, 351, 561 A, 137/625.28, 599.01
See application file for complete search history.

(56) References Cited

U.S. PATENT DOCUMENTS

| | | | | |
|---|---|---|---|---|
| 5,669,813 A | * | 9/1997 | Jairazbhoy et al. | 454/69 |
| 5,937,664 A | * | 8/1999 | Matsuno et al. | 62/259.2 |
| 5,979,540 A | * | 11/1999 | Allison et al. | 165/41 |
| 6,481,230 B2 | * | 11/2002 | Kimishima et al. | 62/239 |
| 6,662,891 B2 | * | 12/2003 | Misu et al. | 180/68.1 |
| 7,013,659 B2 | * | 3/2006 | Yoshida et al. | 62/186 |
| 7,331,532 B2 | * | 2/2008 | Currie et al. | 236/49.3 |
| 7,370,695 B2 | * | 5/2008 | Haglsperger et al. | 165/202 |
| 7,635,040 B2 | * | 12/2009 | Seo et al. | 180/68.1 |
| 7,654,351 B2 | * | 2/2010 | Koike et al. | 180/68.5 |
| 7,735,331 B2 | * | 6/2010 | Zhu et al. | 62/259.2 |
| 2002/0043413 A1 | * | 4/2002 | Kimishima et al. | 180/68.1 |
| 2003/0067747 A1 | | 4/2003 | Hasegawa et al. | |
| 2004/0108148 A1 | * | 6/2004 | Vanderwees et al. | 180/65.1 |
| 2005/0011692 A1 | | 1/2005 | Takahashi et al. | |

(Continued)

FOREIGN PATENT DOCUMENTS

DE    41 06 684 A1 A    9/1992

(Continued)

*Primary Examiner* — Steven B McAllister
*Assistant Examiner* — Phillip E Decker
(74) *Attorney, Agent, or Firm* — Kenyon & Kenyon LLP (57) ABSTRACT

A cooling structure for an electricity storage device includes: a secondary battery generating heat; a DC-DC converter generating heat in a quantity different from that of secondary battery; an exhaust path for passing air after cooling secondary battery generating heat in a relatively small quantity, and led to the outside of a vehicle; an exhaust path for passing air after cooling DC-DC converter generating heat in a relatively large quantity, and joining exhaust path; and a circulation path connected to exhaust path upstream of an air flow beyond a position at which exhaust path joins, and led to the inside of a vehicle compartment. With this configuration, there is provided a cooling structure for an electricity storage device in which the suppression of both increase in temperature and decrease in inner pressure inside the vehicle compartment can be effectively achieved at the same time.

6 Claims, 3 Drawing Sheets

U.S. PATENT DOCUMENTS

| | | |
|---|---|---|
| 2005/0111167 A1 | 5/2005 | Yamaguchi et al. |
| 2005/0138941 A1 | 6/2005 | Kikuchi |
| 2006/0080986 A1* | 4/2006 | Inoue .......................... 62/259.2 |
| 2007/0178346 A1* | 8/2007 | Kiya et al. ...................... 429/24 |
| 2008/0066476 A1* | 3/2008 | Zhu et al. ......................... 62/133 |
| 2008/0296075 A1* | 12/2008 | Zhu et al. ..................... 180/68.1 |
| 2009/0260905 A1* | 10/2009 | Shinmura .................... 180/68.1 |

FOREIGN PATENT DOCUMENTS

| | | |
|---|---|---|
| JP | 47-18212 | 10/1972 |
| JP | 10-306722 A | 11/1998 |
| JP | 11-180169 | 7/1999 |
| JP | 2002-144888 A | 5/2002 |
| JP | 2003-79003 A | 3/2003 |
| JP | 2003-178815 A | 6/2003 |
| JP | 2004-306726 A | 11/2004 |
| JP | 2005-178732 A | 7/2005 |
| JP | 2005-186868 A | 7/2005 |
| JP | 2005-247157 A | 9/2005 |
| JP | 2007099150 A * | 4/2007 |
| SE | 516550 C2 * | 1/2002 |
| WO | WO2007043341 A1 * | 4/2007 |

* cited by examiner

COOLING STRUCTURE FOR ELECTRICITY STORAGE DEVICE

This is a 371 national phase application of PCT/JP2006/320692 filed 11 Oct. 2006, claiming priority to Japanese Patent Application No. 2005-300658 filed 14 Oct. 2005, the contents of which are incorporated herein by reference.

TECHNICAL FIELD

The present invention generally relates to a cooling structure for an electricity storage device and, more particularly, to a cooling structure for an electricity storage device to be mounted in an electric car or a hybrid car.

BACKGROUND ART

As to a conventional cooling structure for an electricity storage device, Japanese Patent Laying-Open No. 10-306722, for example, discloses a battery cooling system for a vehicle that is directed to efficiently cool a battery by the use of air inside a vehicle compartment without impairing comfort inside an air-conditioned vehicle compartment. The battery cooling device disclosed in this document has an exhaust mode in which air after cooling the battery is exhausted through an exhaust duct to the outside of the vehicle, and a circulation mode in which the air is returned into the vehicle compartment through a circulation duct connected to the exhaust duct. In addition, the vehicle is provided with an air-conditioning device for conditioning air inside the vehicle compartment. The air-conditioning device has an interior air circulation mode in which interior air is introduced into an air-conditioning duct, and an exterior air introduction mode in which exterior air is introduced into the air-conditioning duct.

Further, Japanese Patent Laying-Open No. 2004-306726 discloses a battery pack cooling structure that is directed to efficiently cool a battery and an electric instrument attached to the battery. According to this document, cooling air is supplied to a space between battery modules and to a space between a battery unit and a DC-DC converter by the use of a cross-flow fan.

Moreover, Japanese Patent Laying-Open No. 11-180169 discloses an electric part cooling structure that is directed to certainly cool an electric part in an electric car without adversely affecting the reliability and durability of the electric part. According to this document, a battery and an electric part are housed in a battery box. Cooling air introduced into the battery box is adapted to cool the battery and the electric part in sequence.

In the aforementioned battery cooling system for a vehicle disclosed in Japanese Patent Laying-Open No. 10-306722, the exhaust mode or the circulation mode in the cooling device and the interior air circulation mode or the exterior air introduction mode in the air-conditioning device are selected based on the operational status of an air-conditioner, the air-conditioned state inside the vehicle compartment and a battery temperature. In this manner, the battery is cooled while-suppressing decrease in pressure inside the vehicle compartment or increase in air-conditioning load. However, in the case where the temperature of the air to be sent to the exhaust duct is very high, it may become difficult to suppress increase in temperature inside the vehicle compartment and to suppress decrease in inner pressure inside the vehicle compartment at the same time.

DISCLOSURE OF THE INVENTION

In order to solve the above-described problems, an object of the present invention is to provide a cooling structure for an electricity storage device in which the suppression of increase in temperature inside a vehicle compartment and the suppression of decrease in inner pressure inside the vehicle compartment can be effectively achieved at the same time.

A cooling structure for an electricity storage device according to an aspect of the present invention includes an electricity storage that generates heat; an instrument which generates heat in a quantity different from that of the electricity storage; a first air path for passing air after cooling either one of the electricity storage and the instrument that generates heat in a relatively small quantity, the first air path being led to the outside of a vehicle; a second air path for passing air after cooling the other of the electricity storage and the instrument that generates heat in a relatively large quantity, the second air path joining the first air path; and a circulation path connected to the first air path upstream of an air flow beyond a position at which the second air path joins and led to the inside of a vehicle compartment.

With the cooling structure for the electricity storage device so configured as described above, part of the air after cooling either one of the electricity storage and the instrument that generates heat in a relatively small quantity, is returned to the inside of the vehicle compartment from the first air path through the circulation path. As a consequence, in the cooling structure for the electricity storage device in which the air inside the vehicle compartment is fed to the electricity storage and the instrument in parallel, the decrease in inner pressure inside the vehicle compartment can be suppressed while suppressing the increase in temperature inside the vehicle compartment.

A cooling structure for an electricity storage device according to another aspect of the present invention includes: an electricity storage that generates heat; an instrument that generates heat in a quantity different from that of the electricity storage; an air path for passing air for cooling the electricity storage and the instrument, the air path being led to the outside of a vehicle. Either one of the electricity storage and the instrument that generates heat in a relatively small quantity is disposed upstream of an air flow in the air path beyond the other of the electricity storage and the instrument that generates heat in a relatively large quantity. The cooling structure for the electricity storage device further includes a circulation path connected to the air path downstream of the air flow beyond either one of the electricity storage and the instrument that generates heat in a relatively small quantity and upstream of the air flow beyond the other of the electricity storage and the instrument that generates heat in a relatively large quantity, the circulation path being led to the inside of a vehicle compartment.

With the cooling structure for the electricity storage device so configured as described above, the air after cooling either one of the electricity storage and the instrument that generates heat in a relatively small quantity, and before cooling the other of the electricity storage and the instrument that generates heat in a relatively large quantity, is returned to the inside of the vehicle compartment from the air path through the circulation path. As a consequence, in the cooling structure for the electricity storage device in which the air inside the vehicle compartment is fed to the electricity storage and the instrument in series, a decrease in inner pressure inside the vehicle compartment can be suppressed while suppressing an increase in temperature inside the vehicle compartment.

The instrument may be a converter for transforming a voltage from the electricity storage, wherein the converter generates heat in a larger quantity than that of the electricity storage.

As described above, the present invention can provide a cooling structure for an electricity storage device with which the suppression of the increase in temperature inside the vehicle compartment and the suppression of the decrease in inner pressure inside the vehicle compartment can be effectively achieved at the same time.

BEST MODES FOR CARRYING OUT THE INVENTION

Preferred embodiments of the present invention will be described with reference to the drawings. It should be noted that the same or corresponding members are designated by the same reference numerals in the attached drawings for reference.

Embodiment 1

Figure 1:
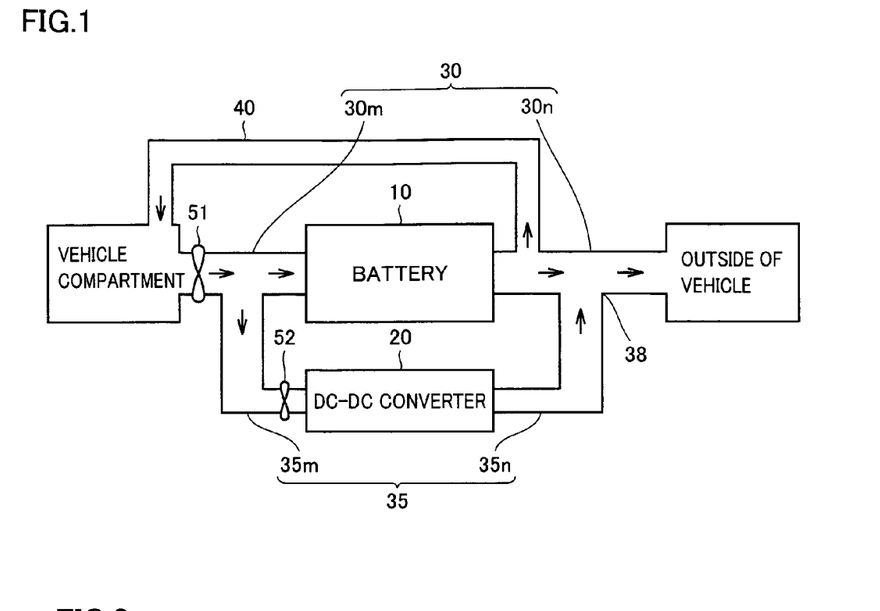
FIG. 1 is a diagram schematically illustrating a flow of cooling air in a cooling structure for an electricity storage device according to Embodiment 1 of the present invention.

FIG. 1 is a diagram schematically illustrating a flow of cooling air in a cooling structure for an electricity storage device according to Embodiment 1 of the present invention. Referring to FIG. 1, the cooling structure for the electricity storage device is applied to a hybrid car using an internal combustion engine such as a gasoline engine or a diesel engine and an electrically chargeable/dischargeable secondary battery as power sources in the present embodiment.

The cooling structure for the electricity storage device in the present embodiment includes: a secondary battery 10; a DC-DC converter 20 electrically connected to secondary battery 10; a cooling air path 30 extending from the inside of a vehicle compartment to the outside of the vehicle and having secondary battery 10 disposed on the way thereof, and a cooling air path 35 extending in parallel to cooling air path 30 and having DC-DC converter 20 on the way thereof.

Secondary battery 10 is constituted of, for example, a nickel metal hydride battery or a lithium ion battery, although not particularly limited thereto. DC-DC converter 20 is adapted to decrease a high voltage outputted from secondary battery 10 down to a voltage for use in auxiliary machinery such as a lamp and audio instrument in the vehicle or each of ECUs (Electronic Control Units) mounted in the vehicle, and then, to electrically charge an auxiliary battery (not illustrated). Both of secondary battery 10 and DC-DC converter 20 generate heat during operation. A quantity of heat generated in secondary battery 10 is different from that generated in DC-DC converter 20, and the quantity of heat generated in DC-DC converter 20 is larger than that generated in secondary battery 10 in the present embodiment.

Cooling air path 30 is constituted of an intake path 30m extending from the inside of the vehicle compartment to secondary battery 10 and an exhaust path 3 On extending from secondary battery 10 to the outside of the vehicle. A fan 51 is disposed on the way of intake path 30m. Cooling air path 35 is constituted of an intake path 35m branched from intake path 30m and extending to DC-DC converter 20, and an exhaust path 35n extending from DC-DC converter 20 and joining on the way of exhaust path 30n. An assisting fan 52 is disposed on the way of intake path 35m.

Fan 51 is driven when it is determined, based on a battery temperature detected at secondary battery 10, that cooling is required. Upon driving fan 51, air inside the vehicle compartment flows through intake path 30m, and then, is supplied as cooling air to secondary battery 10. The air after cooling secondary battery 10 is exhausted to the outside of the vehicle through exhaust path 30n.

Simultaneously, part of the air flowing through intake path 30m is supplied to DC-DC converter 20 through intake path 35m. The air after cooling DC-DC converter 20 is exhausted to the outside of the vehicle together with the air after cooling secondary battery 10 through exhaust path 35n and exhaust path 30n in sequence. Assisting fan 52 is driven together with fan 51 when it is determined that DC-DC converter 20 cannot be satisfactorily cooled only with the drive of fan 51.

It should be noted that the installation positions of the fans are not limited to the positions illustrated in the figure. For example, a fan may be disposed only in intake path 30m. A multiblade fan, a cross-flow fan, a propeller fan, or the like may be appropriately used as the fan.

The cooling structure for the electricity storage device further includes a circulation path 40 connected between secondary battery 10 and a position 38 at which exhaust path 35n joins exhaust path 30n, and communicating with the inside of the vehicle compartment. Circulation path 40 is connected to exhaust path 30n upstream of the air flow in cooling air path 30 beyond position 38.

With the above-described configuration, part of the air flowing through exhaust path 30n after cooling secondary battery 10 is returned to the inside of the vehicle compartment through circulation path 40. The air after cooling secondary battery 10 is introduced into circulation path 40 before the air after cooling DC-DC converter 20 joins.

It should be noted that, although the description is given on the case where the quantity of heat generated in DC-DC converter 20 is larger than that generated in secondary battery 10 in the present embodiment, the quantity of heat generated in secondary battery 10 may be larger than that generated in DC-DC converter 20 depending. on the performance or the like of the battery and the converter. In such a case, secondary battery 10 and DC-DC converter 20 are arranged, for example, reversely to the arrangement illustrated in FIG. 1.

Figure 2:
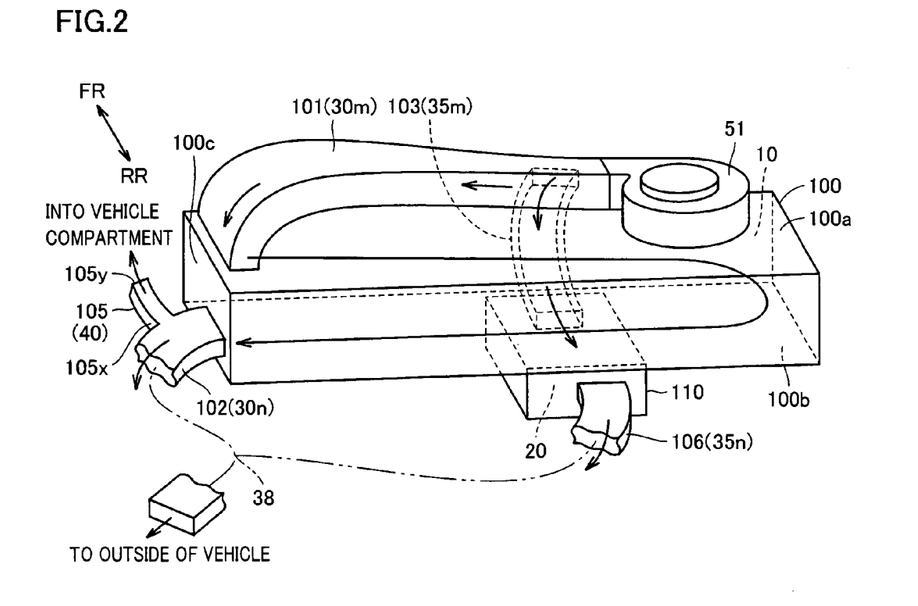
FIG. 2 is a perspective view specifically showing the cooling structure for the electricity storage device according to Embodiment 1 of the present invention.

FIG. 2 is a perspective view specifically showing the cooling structure for the electricity storage device according to Embodiment 1 of the present invention. FIG. 2 shows a battery pack when a luggage room defined at a rear portion in the vehicle is viewed from the back of the vehicle.

Referring to FIG. 2, a hybrid car includes a cabin which passengers get in, and a luggage room defined adjacent to the cabin at a rear portion in the vehicle. Air is allowed to pass between the luggage room and the cabin. The vehicle compartment according to the present invention includes the cabin and the luggage room. Secondary battery 10 and DC-DC converter 20 are mounted inside the luggage room.

Secondary battery 10 is housed inside a battery case 100. Battery case 100 is formed into a substantially rectangular shape having long and short sides, as the vehicle is viewed on a plane. Battery case 100 is installed in such a manner that the short side is substantially aligned in a lengthwise direction of the vehicle whereas the long side is substantially aligned in a widthwise direction of the vehicle. DC-DC converter 20 is housed inside an instrument case 110. Instrument case 110 is secured to a bottom surface 100b of battery case 100.

It should be noted that secondary battery 10 and DC-DC converter 20 may be installed under front seats, rear seats, a center console interposed between a driver's seat and a side seat as the front seats, or the like. In the case of a vehicle of three-row seat model, secondary battery 10 and DC-DC converter 20 may be installed under a second seat or a third seat. Otherwise, secondary battery 10 and DC-DC converter 20 may be installed at positions remote from each other in the vehicle.

On a top surface 100a of battery case 100, fan 51 that is a multiblade fan is mounted. Fan 51 is connected to a duct for feeding air inside the vehicle compartment to fan 51, although not illustrated. The duct is formed in a package tray disposed at a rear portion of the rear seat, and extends from an intake port opened to the inside of the cabin toward fan 51. Inside instrument case 110, assisting fan 52 is housed.

Intake path 30m is constituted of an intake duct 101. Intake duct 101 extends along top surface 100a of battery case 100 from an air blowing port of fan 51, and communicates with the inside of battery case 100 at top surface 100a. Exhaust path 30n is constituted of an exhaust duct 102. Exhaust duct 102 communicates with the inside of battery case 100 at a side surface 100c of battery case 100, and extends from battery case 100 to the outside of the vehicle.

Intake path 35m is constituted of an intake duct 103. Intake duct 103 is branched from intake duct 101 at top surface 100a, extends near battery case 100, and communicates with the inside of instrument case 110. Exhaust path 35n is constituted of an exhaust duct 106. Exhaust duct 106 communicates with the inside of instrument case 110, extends from instrument case 110 to exhaust duct 102, and is connected to position 38. Circulation path 40 is constituted of a circulation duct 105. Circulation duct 105 includes one end 105x connected to exhaust duct 102 between battery case 100 and position 38 and the other end 105y opened to the inside of the luggage room.

It should be noted that the other end 105y of circulation duct 105 is not limited to be opened to the inside of the luggage room, and may be opened to the inside of the cabin. In such a case, the other end 105y should be preferably opened, for example, under the rear seat installed in the cabin. As a consequence, the opening position of the other end 105y can be separated from the intake port formed in the package tray, and therefore, the air exhausted from the other end 105y is hardly introduced through the intake port. In addition, the other end 105y is opened around feet of a passenger sitting on the rear seat, thereby preventing any unpleasant feeling of the passenger by the warm air exhausted from the other end 105y.

The other end 105y of circulation duct 105 is preferably opened at a position lower than the surfaces of the seats installed inside the cabin. The other end 105y of circulation duct 105 may be opened, for example, under seats other than the rear seat, on a floor of the cabin or under a dashboard.

The cooling structure for the electricity storage device according to Embodiment 1 of the present invention includes: secondary battery 10 serving as an electricity storage that generates heat; DC-DC converter 20 serving as an instrument that generates heat in a quantity different from that of secondary battery 10; exhaust path 30n serving as a first air path for passing the air after cooling secondary battery 10 serving as either one of secondary battery 10 and DC-DC converter 20 that generates heat in a relatively small quantity, exhaust path 30n being led to the outside of the vehicle; exhaust path 35n for passing the air after cooling DC-DC converter 20 serving as the other of secondary battery 10 and DC-DC converter 20 that generates heat in a relatively large quantity, exhaust path 35n joining exhaust path 30n; and circulation path 40 connected to exhaust path 30n upstream of the air flow beyond position 38 at which exhaust path 35n joins, circulation path 40 being led to the inside of the vehicle compartment.

With the cooling structure for the electricity storage device according to Embodiment 1 of the present invention so configured as described above, part of the air after cooling secondary battery 10 that generates heat in a relatively small quantity is returned to the vehicle compartment, whereas the air after cooling DC-DC converter 20 that generates heat in a relatively large quantity is not returned to the vehicle compartment but exhausted to the outside of the vehicle. As a consequence, a decrease in inner pressure of the vehicle compartment can be effectively suppressed without markedly increasing the temperature inside the vehicle compartment. Thus, an odor of exhaust gas outside the vehicle, for example, can be prevented from intruding into the vehicle compartment through a clearance in a body.

Figure 3:
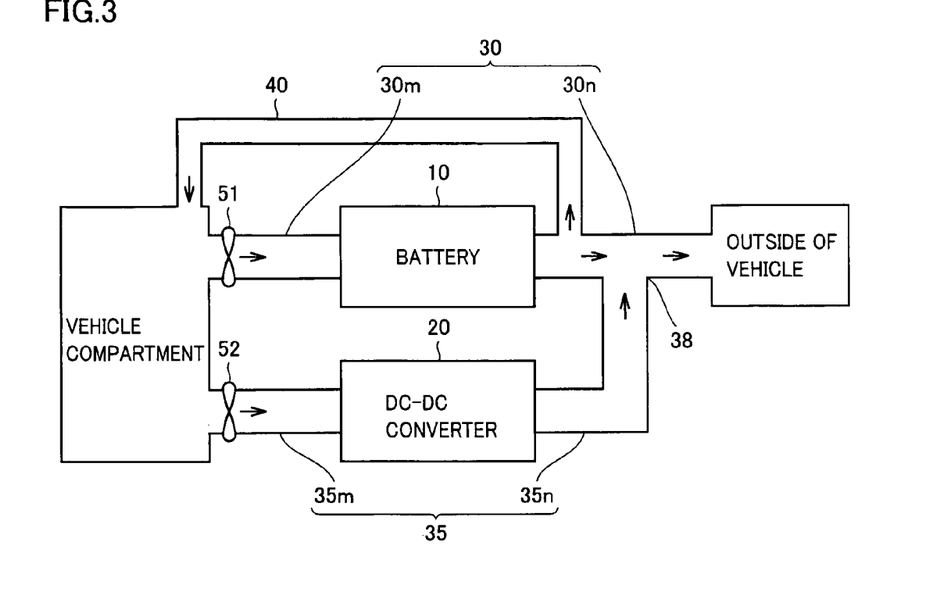
FIG. 3 is a diagram illustrating a flow of cooling air in the cooling structure for the electricity storage device shown in FIG. 1 according to a modification.

FIG. 3 is a diagram illustrating a flow of cooling air in the cooling structure for the electricity storage device shown in FIG. 1 according to a modification. Referring to FIG. 3, an intake path 35m is not branched from intake path 30m but extends between the vehicle compartment and DC-DC converter 20 in the present modification. On the way of intake path 35m, a fan 52 is disposed. Air inside the vehicle compartment is supplied directly to DC-DC converter 20 through intake path 35m by driving fan 52. In the cooling structure for the electricity storage device with the above-described configuration, the above-described effects can be produced likewise.

It should be noted that the instrument according to the present invention is not limited to the DC-DC converter, but may be an inverter that converts a DC current from a secondary battery into an AC current for driving a motor, and converts an AC current generated by a regenerative brake into a DC current for electrically charging the secondary battery. Also, the instrument may be a booster converter that is interposed between an inverter and a secondary battery, to step up electricity inputted to the inverter from the secondary battery or step down a voltage inputted to the secondary battery from the inverter. Alternatively, the instrument may be a relay for controlling a high voltage circuit in a secondary battery or a junction box as a group of electric instruments having various sensors mounted thereon for detecting a total voltage and a charge/discharge current of a secondary battery. Further, the instrument may be constituted of a plurality of above-described instruments.

Although the cooling structure for the electricity storage device according to the present invention is applied to a hybrid car using an internal combustion engine and a secondary battery as power sources in the present embodiment, the present invention is also applicable to a fuel cell hybrid vehicle (FCHV) using a fuel cell and a secondary battery as power sources or to an electric vehicle (EV). The internal combustion engine is driven at a fuel consumption optimum operation point in the hybrid car in the present embodiment; in contrast, the fuel cell is driven at a power generation efficiency optimum operation point in the fuel cell hybrid vehicle. Both of the hybrid vehicles are basically the same in the use of the secondary battery.

The electricity storage is not limited to the secondary battery that produces electricity with a chemical reaction and the like by itself, but it may be a capacitor or the like that stores electricity supplied from the outside.

The capacitor refers to an electric double layer capacitor that principally actuates by the use of an electric double layer formed at an interface between activated carbon and an electrolytic solution. By using the activated carbon as a solid and the electrolytic solution (an aqueous solution of dilute sulfuric acid) as a liquid in contact with each other, positive and negative electrodes are relatively distributed at very short intervals on the interface. When a pair of electrodes is soaked in an ionic solution with the application of a voltage to such an extent as not to generate electrolysis, ions are adsorbed onto the surface of each electrode, whereby positive and negative electricity is stored (i.e., electric charge). When the electricity is discharged to the outside, positive and negative ions are separated from the electrodes, so that neutralization is regained (i.e., electric discharge).

Embodiment 2

Figure 4:
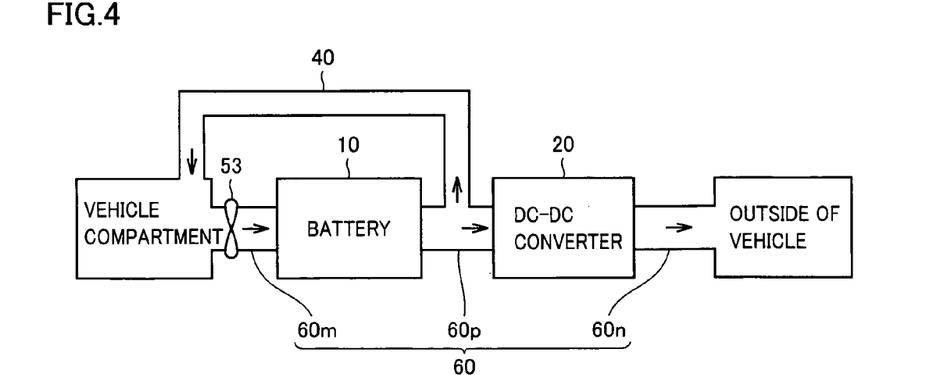
FIG. 4 is a diagram schematically illustrating a flow of cooling air in a cooling structure for an electricity storage device according to Embodiment 2 of the present invention.

FIG. 4 is a diagram schematically illustrating a flow of cooling air in a cooling structure for an electricity storage device according to Embodiment 2 of the present invention. The cooling structure for the electricity storage device in the present embodiment is basically similar to that in Embodiment 1. Therefore, no description will be repeated below on the same structure.

Referring to FIG. 4, the cooling structure for the electricity storage device in the present embodiment includes: a secondary battery 10; a DC-DC converter 20; and a cooling air path 60 that extends from a vehicle compartment to the outside of the vehicle and on the way of which secondary battery 10 and DC-DC converter 20 are arranged in series.

Cooling air path 60 is constituted of an intake path 60$m$ extending from the inside of the vehicle compartment to secondary battery 10, an intermediate path 60$p$ extending from secondary battery 10 to DC-DC converter 20, and an exhaust path 60$n$ extending from DC-DC converter 20 to the outside of the vehicle. On the way of intake path 60$m$, a fan 53 is disposed.

Upon driving fan 53, air inside the vehicle compartment flows through intake path 60$m$, and then is supplied as cooling air to secondary battery 10. The air after cooling secondary battery 10 is supplied to DC-DC converter 20. through intermediate path 60$p$. Moreover, the air after cooling DC-DC converter 20 is exhausted to the outside of the vehicle through exhaust path 60$n$. That is to say, secondary battery 10 is disposed upstream of the cooling air flowing through cooling air path 60 beyond DC-DC converter 20.

The cooling structure for the electricity storage device further includes a circulation path 40 that is connected on the way of intermediate path 60$p$ and communicates with the inside of the vehicle compartment. Circulation path 40 is connected to cooling air path 60 between secondary battery 10 and DC-DC converter 20.

With the above-described configuration, part of the air flowing through intermediate path 60$p$ after cooling secondary battery 10 and before cooling DC-DC converter 20 is returned into the vehicle compartment through circulation path 40. The air after cooling both of secondary battery 10 and DC-DC converter 20 is not returned into the vehicle compartment, but is exhausted to the outside of the vehicle.

The cooling structure for the electricity storage device according to the Embodiment 2 of the present invention includes: secondary battery 10 serving as an electricity storage that generates heat; DC-DC converter 20 serving as an instrument that generates heat in a quantity different from that of secondary battery 10; and cooling air path 60 serving as an air path for passing the air for cooling secondary battery 10 and DC-DC converter 20, cooling air path 60 being led to the outside of the vehicle. Secondary battery 10 serving as either one of secondary battery 10 and DC-DC converter 20 that generates heat in a relatively small quantity, is disposed upstream of the air flow in cooling air path 60 beyond DC-DC converter 20 serving as the other of secondary battery 10 and DC-DC converter 20 that generates heat in a relatively large quantity. The cooling structure for the electricity storage device further includes circulation path 40 connected to cooling air path 60 downstream of the air flow beyond secondary battery 10 and upstream of the air flow beyond DC-DC converter 20 and led to the inside of the vehicle compartment.

The cooling structure for the electricity storage device according to Embodiment 2 of the present invention so configured as described above can produce similar effects to those produced in Embodiment 1.

Figure 5:
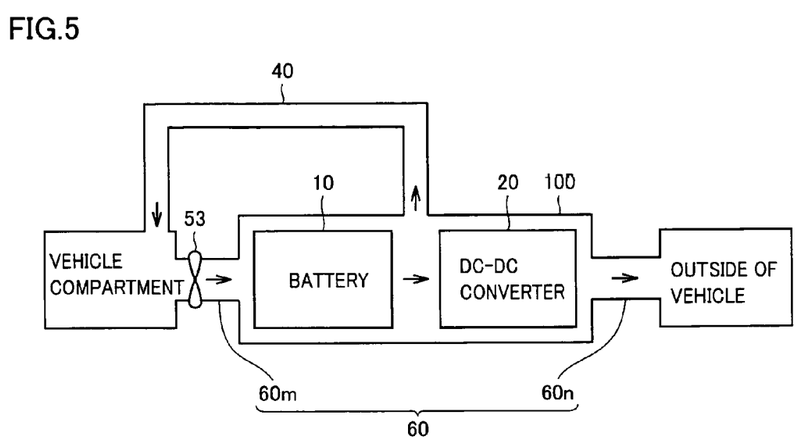
FIG. 5 is a diagram illustrating a flow of cooling air in the cooling structure for the electricity storage device shown in FIG. 4 according to a modification.

FIG. 5 is a diagram illustrating a flow of cooling air in the cooling structure for the electricity storage device shown in FIG. 4 according to a modification. Referring to FIG. 5, a DC-DC converter 20 is housed in a battery case 100 together with secondary battery 10 in the present modification. A cooling air path 60 is constituted of an intake path 60$m$ communicating with the inside of battery case 100 from the inside of a vehicle compartment and an exhaust path 60$n$ communicating with the inside of battery case 100 and extending from battery case 100 to the outside of the vehicle. Secondary battery 10 is disposed upstream of air flowing through the inside of battery case 100 beyond DC-DC converter 20. The cooling structure for the electricity storage device so configured as described above also can produce the above-described effects likewise.

It should be understood that the embodiments described herein are illustrative in all respects, and therefore not restrictive. The scope of the present invention is shown not in the above description but in the appended claims, and all of changes and modifications are encompassed within the scope equivalent to those of the claims.

INDUSTRIAL APPLICABILITY

The present invention is principally applied to the cooling structure for the electricity storage device mounted in an electric car or a hybrid car.

The invention claimed is:

1. A cooling structure, comprising:
   an electricity storage device that generates heat;
   an instrument that generates heat in a larger quantity than that of said electricity storage device;
   a first air duct for passing air after cooling said electricity storage device, said first air duct circulating air to the outside of a vehicle;
   a second air duct for passing air after cooling said instrument, said second air duct joining said first air duct; and
   a circulation duct connected to said first air duct upstream a position at which said second air duct joins, said circulation path circulating air to the inside of a vehicle compartment,
   said first air duct being constituted of an exhaust duct for exhausting air to the outside of a vehicle.

2. The cooling structure according to claim 1, wherein said instrument is a converter for transforming a voltage from said electricity storage device.

3. A cooling structure, comprising:
an electricity storage device that generates heat;
an instrument that generates heat in a larger quantity than that of said electricity storage device;
an air duct for passing air for cooling said electricity storage device and said instrument, said air duct circulating air to the outside of a vehicle, and
said electricity storage device disposed upstream said instrument,
a circulation duct connected to said air duct downstream said electricity storage device and upstream said instrument, said circulation duct circulating air to the inside of a vehicle compartment.

4. The cooling structure according to claim 3, wherein said instrument is a converter for transforming a voltage from said electricity storage device.

5. A cooling structure, comprising:
an electricity storage device that generates heat;
an instrument that generates heat in a smaller quantity than that of said electricity storage device;
a first air duct for passing air after cooling said instrument that generates heat,
said first air duct circulating air to the outside of a vehicle;
a second air duct for passing air after cooling said electricity storage device, said second air duct joining said first air duct; and
a circulation duct connected to said first air duct upstream a position at which said second air duct joins, said circulation duct circulating air to the inside of a vehicle compartment,
said first air duct being constituted of an exhaust duct for exhausting air to the outside of a vehicle.

6. A cooling structure, comprising:
an electricity storage device that generates heat;
an instrument that generates heat in a smaller quantity than that of said electricity storage device;
an air duct for passing air for cooling said electricity storage device and said instrument, said air duct circulating air to the outside of a vehicle, and
said instrument being disposed upstream of said electricity storage device,
a circulation duct connected to said air duct downstream said instrument and upstream said electricity storage device, said circulation duct circulating air to the inside of a vehicle compartment.

* * * * *

UNITED STATES PATENT AND TRADEMARK OFFICE
CERTIFICATE OF CORRECTION

| | |
|---|---|
| PATENT NO. | : 7,997,966 B2 |
| APPLICATION NO. | : 12/083337 |
| DATED | : August 16, 2011 |
| INVENTOR(S) | : Takehito Yoda |

It is certified that error appears in the above-identified patent and that said Letters Patent is hereby corrected as shown below:

| Column | Line | |
|---|---|---|
| 4 | 3 | Change "exhaust path 3 On" to --exhaust path 30$n$--. |

Signed and Sealed this
Twenty-first Day of February, 2012

David J. Kappos
*Director of the United States Patent and Trademark Office*